United States Patent [19]

Kroenke et al.

[11] Patent Number: 5,109,051
[45] Date of Patent: Apr. 28, 1992

[54] ALUMINOSILICATE COMPOSITIONS AS PARTIAL REPLACEMENT FOR TITANIUM DIOXIDE IN PIGMENTED POLYVINYL CHLORIDE AND POLYVINYL CHLORIDE TYPE COMPOSITIONS

[75] Inventors: William J. Kroenke, Brecksville; Ervin J. Williger, Tallmadge, both of Ohio

[73] Assignee: The B. F. Goodrich Company, Brecksville, Ohio

[21] Appl. No.: 492,702

[22] Filed: Mar. 13, 1990

[51] Int. Cl.$^5$ ............................................. C08K 3/34
[52] U.S. Cl. ..................................... 524/444; 524/447
[58] Field of Search ............... 524/444, 447, 493, 507, 524/513, 527

[56] References Cited

U.S. PATENT DOCUMENTS

| | | |
|---|---|---|
| 3,509,082 | 4/1970 | Mays . |
| 3,654,217 | 4/1972 | Cerri .................................... 524/444 |
| 3,827,901 | 8/1974 | Griffin et al. . |
| 3,907,656 | 9/1975 | de Souza . |
| 3,998,973 | 12/1976 | Carlson . |
| 4,078,941 | 3/1978 | Bundy et al. . |
| 4,434,268 | 2/1984 | Doroszkowsky et al. ......... 524/527 |
| 4,525,518 | 6/1985 | Kostansek ........................... 524/447 |
| 4,584,330 | 4/1986 | Wason . |
| 4,613,533 | 9/1986 | Loomis ................................ 428/36 |
| 4,677,022 | 6/1987 | Dejaiffe . |
| 4,689,211 | 8/1987 | Kishiuchi et al. . |
| 4,812,299 | 3/1989 | Huber . |

Primary Examiner—Paul R. Michl
Assistant Examiner—Edward J. Cain
Attorney, Agent, or Firm—Daniel J. Hudak; Nestor W. Shust

[57] ABSTRACT

Disclosed are polyvinyl chloride and polyvinyl chloride type compositions using a titanium dioxide based whitening/opacifying package containing up to about 30 percent by weight of an aluminosilicate composition. In the whitening/opacifying package the aluminosilicate composition acts as a replacement for the same amount by weight of titanium dioxide. The whitening/opacifying package achieves a measure of overall appearance (DE* value), a Yellowness Index, and a percentage of light transmitted (opacity) which are substantially comparable or superior to those achieved by the same weight of pure titanium dioxide.

22 Claims, No Drawings

ALUMINOSILICATE COMPOSITIONS AS PARTIAL REPLACEMENT FOR TITANIUM DIOXIDE IN PIGMENTED POLYVINYL CHLORIDE AND POLYVINYL CHLORIDE TYPE COMPOSITIONS

FIELD OF THE INVENTION

The invention relates to pigmented polymer compositions, and more particularly to whitening/opacifying polyvinyl chloride compositions having a reduced content of titanium dioxide.

BACKGROUND OF THE INVENTION

It has been customary in the past to make whitened or otherwise pigmented polyvinyl chloride polymers or compositions using titanium dioxide as a whitener. In the past the sole additive which has been known for use to achieve sufficient hiding ability (i.e., opacity) has been titanium dioxide. This has effectively presented a monopoly for the producers and distributors of this composition. The appearance of such polymers or compositions is measured relative to the overall color hue of the material, the degree of yellowness, and the opacity of the material.

Since the supply of titanium dioxide is at times less than the demand, it is an advantage to find a substitute for titanium dioxide as a whitener and/or opacifying agent. Attempts have been made in the past to find such substitutes. For example, carbon black has been used for its opacifying characteristics. However, carbon black presents the disadvantage that it discolors, i.e., darkens, the compositions in which it is used and makes it difficult to achieve a white or lightly-tinted composition. In the paint and paper industry, in particular, hollow plastic microspheres have been used but these whiteners and/or opacifying agents do not stand up to processing conditions which are used for polyvinyl chloride type compositions.

U.S. Pat. No. 3,827,901 (Griffin et al, Aug. 6, 1974) relates to a composition of matter which is useful as a pigment composition for the paper industry. The composition is water-insoluble and comprises an intimate mixture of titanium dioxide and a calcium-aluminum-silicate composition in which the amount of titanium dioxide employed is from 0.6 to 4 parts for each part of the calcium-aluminum-silicate composition.

U.S. Pat. No. 4,078,941 (Bundy et al, Mar. 14, 1978) relates to a high bulking clay consisting essentially of selected flocculated ultrafine particles of clay coated with a member from the group consisting of polyfunctional amines and long chain amines.

U.S. Pat. No. 4,525,518 (Kostansek, Jun. 25, 1985) relates to pigments useful as primary extenders in exterior grade latex formulations. The pigments are composed of particles of calcined clay, substantially all the particles of which are finer than about 44 microns, and having an average particle size, equivalent spherical diameter, within the range of about 3 to 10 microns, most preferably within the range of about 4 to 8 microns.

U.S. Pat. No. 4,677,022 (Dejaiffe, Jun. 30, 1987) relates to a method of producing lightweight bodies having a glossy exterior which are suitable for use as modifiers, enhancers, fillers, extenders, and opacifiers in polymeric formulations. The reference also relates to the lightweight bodies themselves and to plastic composites in which those lightweight bodies are incorporated.

SUMMARY OF THE INVENTION

This invention relates to a pigmented polymer composition, comprising; a pigmented polymer, said pigmented polymer comprising (1) a vinyl chloride polymer prepared from vinyl chloride monomer, (2) a polyvinylidene chloride prepared from vinylidene chloride, (3) a copolymer of vinyl chloride monomer and a vinyl component monomer, or (4) a mixture of polyvinyl chloride and (a) a polymer prepared from a vinyl component monomer, (b) a halogenated polymer prepared from a non-vinyl component monomer, (c) a polyester, (d) a polyurethane, (e) a polyethylene oxide polymer, or (f) mixtures thereof, and a whitening/opacifying package of from about 2 to about 30 parts of this package per hundred parts resin (phr). The above polymer composition can be replaced with a pigmented chlorinated vinyl chloride polymeric composition comprising a chlorinated vinyl chloride polymer containing from about 48 percent up to about 74 percent chlorine prepared by chlorinating (1) polyvinyl chloride, (2) a copolymer of vinyl chloride monomer and a vinyl component monomer, or (3) mixtures thereof.

Further the above polymer composition can be replaced with a pigmented polymer composition comprising a mixture of (A) a chlorinated vinyl chloride polymer containing from about 48 percent up to about 74 percent chlorine prepared by chlorinating (1) polyvinyl chloride or (2) a copolymer of vinyl chloride monomer and a vinyl component monomer, with (B) any of the following polymers (1) a polymer prepared from a vinyl component monomer, (2) a halogenated polymer prepared from a non-vinyl component monomer, (3) a polyester, (4) a polyurethane, (5) a polyethylene oxide polymer, or (6) mixtures thereof, wherein the weight ratio of (A):(B) is from about 70:30 to about 95:5.

The whitening/opacifying package comprises titanium dioxide and from an effective amount up to about 30 percent by weight of an aluminosilicate composition as a replacement for titanium dioxide. In the whitening/opacifying package the aluminosilicate composition acts as a replacement for the same amount by weight of titanium dioxide. The whitening/opacifying package achieves a measure of overall appearance, a Yellowness Index and percentage of light transmitted (opacity) which are substantially comparable or superior to those achieved by the same weight of pure titanium dioxide. By substantially comparable is meant that the measure of overall appearance, DE*, further defined in Example 1, the Yellowness Index, Y.I., and the percent light transmission values of a pigmented polymer composition using the whitening/opacifying package are substantially the same as, or better than, the same pigmented polymer composition containing a weight of titanium dioxide equivalent to the weight of the whitening/opacifying package.

It is an advantage of the present invention to provide a whitening/opacifying package having a reduced content of titanium dioxide while maintaining a suitable degree of whiteness and opacity or even improving on these properties.

It is a further advantage of the invention to provide colored polyvinyl chloride compositions with useful opacifying characteristics. These compositions are suitable for use where whitened and colored polyvinyl chloride and other vinyl type compositions are currently used including domestic uses such as louvercurtains, interior and exterior extruded profiles in the construction industry, for example, windows, house siding, conduits or molded PVC products.

DETAILED DESCRIPTION OF THE INVENTION

The invention relates to a pigmented polymer composition having a titanium dioxide whitening/opacifying package with a reduced titanium dioxide content.

The whitening/opacifying package comprises titanium dioxide and certain aluminosilicate compositions. The aluminosilicate composition acts as a partial replacement (extender) for titanium dioxide so that the amount of titanium dioxide can be reduced from the amount used previously by up to about 30 percent by weight while being replaced with an aluminosilicate composition. While the amount of titanium dioxide can be reduced, the Yellowness Index, DE* color-hue parameter, and the opacity values of the polyvinyl chloride compositions are substantially the same or improved as if the full amount of titanium dioxide were used.

The invention presents surprising results in that it allows the traditional whitener/opacifier, titanium dioxide, to be decreased in concentration in pigmented polymer compositions without deterioration of optical properties.

Titanium dioxide generally is used at a level of from about 2 up to about 30 phr by weight of the polyvinyl chloride type composition, preferably at a level of from about 2 to about 15 phr, and most preferably at a level of from about 4 to about 10 phr by weight. The aluminosilicate composition is used at an effective amount level up to about 7 phr by weight of the polyvinyl chloride composition, preferably from about 1 up to about 5 phr, and most preferably from about 1 up to about 3 phr.

In practicing this invention, the partial replacement of titanium dioxide pigment, with a like quantity of certain aluminosilicate extender compositions of this invention, in a given vinyl chloride polymer composition as described herein will either substantially maintain or improve the values of DE*, Y.I., and opacity. The aluminosilicate extender compositions having utility in this invention are mullite and cordierite. For example, in the examples disclosed herein, the control polyvinyl chloride composition, before replacing part of the titanium dioxide pigment with the aluminosilicate extender compositions of this invention, had a DE* value of 2.54, a Y.I. value of 5.99, and a percent light transmission value of 0.740. After replacing part of the titanium dioxide with the aluminosilicate extender compositions, these performance values either remained essentially unchanged or were lowered (improved performance). It is, of course, recognized that different base polyvinyl chloride compositions will have different sets of the DE*, Y.I., and light transmission values which will remain essentially the same or lower in value by substituting the aluminosilicate extender compositions of this invention for part of the titanium dioxide pigment in the base compositions. It is further recognized that by using the opacifying and whitening package of this invention, it will be possible to make polyvinyl chloride compositions with improved optical properties compared to using only titanium dioxide as the opacifying and whitening agent.

Mullite, $3Al_2O_3.2SiO_2$ or $Al_6Si_2O_{13}$, is an important ceramic raw material for making high temperature resistant refractory materials. It can be readily fused or formed into monolithic ceramic shapes that have low thermal and electrical conductivities and useful strength and modulus properties. Mullite ceramics are used extensively as refractory insulating materials, fire bricks, ceramic furnace tubes, and fixtures for high temperature furnaces and ceramic kilns. Mullite is not used traditionally as an inorganic pigment, or as a particulate filler in either plastic or elastomeric compounds.

The mineral mullite falls within the class of sheet silicates, that are exemplified by the hydrated clay minerals. In fact, mullite can be formed from kaolinite, $Al_2(Si_2O_5)(OH)_4$, the most common of the clay minerals, by calcining kaolinite to temperatures in excess of about 1,000° C. This procedure for converting the fine particle hydrous clay particles into mullite particles results in a product that contains a significant quantity of either amorphous silica or the $\alpha$-cristobalite form of crystalline silica. This synthesis route result does not produce a material that is mainly mullite.

Synthetic mullite powders with high mullite contents, for the ceramic industry more generally are made by fusing mixtures of the component oxides or oxide precursors, with stoichiometries corresponding to mullite, cooling to room temperature, and grinding the product materials to the desired particle size. Because mullite melts incongruently at about 1,828° C., the kinetics of formation of crystalline mullite on cooling from the molten state are not conducive for readily forming crystalline mullite free from $Al_2O_3$ or an amorphous component.

High purity mullite powders can be prepared from the component oxides or oxide precursors using conventional ceramic powder synthetic techniques. The reaction kinetics for the solid state reaction of a mixture of oxides of the mullite stoichiometry to mullite are sluggish at temperatures below the 1,828° C. peritectic decomposition temperature. This generally necessitates a series of calcination operations, each preceded by a grinding operation to assure a high surface area, homogeneous reactant mixture for the next calcination step.

Cordierite, $2MgO.2Al_2O_3.5SiO_2$ or $Mg_2Al_4Si_5O_{18}$, is a useful high temperature ceramic composition that is almost unique in having a very low coefficient of thermal expansion, and consequently a high degree of thermal shock resistance. Monolithic cordierite ceramics also are used as low dielectric loss insulating materials in electrical applications, especially where resistance to thermal shock is an important requirement. Cordierite is not used traditionally as an inorganic pigment, or as a particulate filler in either plastic or elastomeric compounds.

Cordierite belongs to the general class of the orthosilicate/ring silicate rock forming minerals. It is usually synthesized from mixtures of talc, $Mg_3Si_4O_{11} \cdot H_2O$, and kaolinite clay to which extra $Al_2O_3$ or sillimanite, $Al_2SiO_5$ has been added. Similarly, cordierite can be synthesized by calcining a mixture of its component oxides or oxide precursor materials. The kinetics of the solid state reaction to form cordierite are sluggish, and most of the cordierite prepared as a raw material for the ceramics industry contain significant concentrations of $Al_2O_3$ and magnesium silicate minerals. Cordierite also can be formed from the molten state, but since it melts incongruently at about 1,460° C., it is difficult to prepare a high purity cordierite material by cooling from the melt.

Particle size of the aluminosilicate composition is an important consideration with respect to the ability to disperse the aluminosilicate composition in a polyvinyl chloride matrix. When the aluminosilicate composition is mullite or cordierite, a desirable particle size is up to about 20 microns, preferably up to about 10 microns and most preferably up to about 5 microns.

The whitening/opacifying package of the present invention can be used in "whitened polyvinyl chloride compounds." As used herein, "whitened polyvinyl chloride compounds" means either white compounds or, alternatively, colored compounds which utilize titanium dioxide to achieve a desired level of pigmentation and/or opacity.

The pigmented polymer composition comprises;
(1) a vinyl chloride polymer prepared from vinyl chloride monomer,
(2) a polyvinylidene chloride prepared from vinylidene chloride,
(3) a copolymer of vinyl chloride monomer and a vinyl component monomer, or
(4) a mixture of polyvinyl chloride and
(a) a polymer prepared from a vinyl component monomer,
(b) a halogenated polymer prepared from a non-vinyl component monomer,
(c) a polyester,
(d) a polyurethane,
(e) a polyethylene oxide polymer, or
(f) mixtures thereof, in a weight ratio of (4):(a) through (f) of from about 70:30 to about 95:5.

The above polymer composition can be replaced with a pigmented chlorinated vinyl chloride polymeric composition comprising
a chlorinated vinyl chloride polymer containing from about 48 percent up to about 74 percent chlorine prepared by chlorinating
(1) polyvinyl chloride,
(2) a copolymer of vinyl chloride monomer and a vinyl component monomer, in a weight ratio of from about 70:30 to about 95:5, or
(3) mixtures thereof.

Further the above polymer composition can be replaced with a pigmented polymer composition comprising a mixture of
(A) a chlorinated vinyl chloride polymer containing from about 48 percent up to about 74 percent chlorine prepared by chlorinating
(1) polyvinyl chloride or
(2) a copolymer of vinyl chloride monomer and a vinyl component monomer, in a weight ratio of from about 70:30 to about 95:5, with
(B) any of the following polymers (1) a polymer prepared from a vinyl component monomer,
(2) a halogenated polymer prepared from a non-vinyl component monomer,
(3) a polyester,
(4) a polyurethane,
(5) a polyethylene oxide polymer, or
(6) mixtures thereof, wherein the weight ratio of (A):(B) is from about 70:30 to about 95:5.

Vinyl component monomers as used herein broadly include monomers containing vinyl, vinylene, or vinylidene groupings of atoms, and their substituted analogs. Such vinyl chloride polymer compositions include for example, polyvinyl chloride and chlorinated polyvinyl chloride of various degrees of chlorination, specifically including so-called intermediate chlorine resins (greater than 48 percent but less than 67 percent chlorine) and so-called chlorinated polyvinyl chloride (CPVC) containing at least 67 percent and up to about 74 percent chlorine, preferably from about 61 percent to about 74 percent, and most preferably from about 63 percent to about 72 percent chlorine. Polyvinyl chloride compositions also include polyvinylidene chloride prepared from vinylidene chloride monomer and blends of polyvinylidene chloride with other polyvinyl chloride compositions. Vinyl component comonomers which may be used with a chlorinated vinyl component monomer to form copolymers or blends are known in the art and include esters of vinyl aliphatic esters containing from 3 to about 18 carbon atoms; esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butylmethacrylate, and the like; styrene and styrene derivatives having a total of from 8 to 15 carbon atoms such as alpha-methylstyrene, vinyl toluene, chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms and preferably 2 to 4 carbon atoms and the like; and mixtures of any of the above types of monomers and other monomers copolymerizable therewith known to the art and to the literature.

The vinyl chloride polymer blend compositions and chlorinated vinyl chloride polymer blend compositions of the present invention are blends of polyvinyl chloride or chlorinated polyvinyl chloride and one or more polymers such as halogenated polymers prepared from a non-vinyl component monomer comprising chlorosulfonated polyethylene, chlorinated polyethylene, chlorinated polypropylene or polyepichlorohydrin, and graft copolymers or blends of polyvinyl chloride and chlorinated polyvinyl chloride with polyester, polyurethane, and polyethylene oxide polymers. An amount of vinyl chloride monomer is utilized to produce a copolymer or blend containing from about 70 to about 95 percent by weight, and preferably from about 80 to about 93 percent by weight of vinyl chloride repeating units therein. The remainder of the copolymer or blend is made up of repeating units from one or more of the above-noted vinyl component monomers, for example, vinyl acetate or methyl methacrylate, or one or more of the above-noted halogenated polymers or polyester, polyurethane, or polyethylene oxide polymers. Thus, an amount of vinyl component monomer when utilized to produce a copolymer or an amount of halogenated polymer or polyester, polyurethane, or polyethylene oxide polymer to produce a blend is from about 5 to about 30 percent and preferably from about 7 to about 20 percent by weight. Polyvinyl chloride compositions wherein the chlorine level is between about 30 percent to about 74 percent, once prepared, may be blended with halogenated polymers, comprising chlorosulfonated polyethylene, chlorinated polyethylene, and polyepichlorohydrin, and polyester, polyurethane, and polyethylene oxide polymers, wherein the blended polymer is present at from about 5 to about 30 percent and preferably from about 7 to about 20 percent by weight and the preferred polyvinyl chloride composition are blends based on polyvinyl chloride and chlorinated polyvinyl chloride.

A molecular weight of the pigmented polymer composition may be related to its inherent viscosity which is determined herein by dissolving 0.24 gram of the pigmented polymer composition in 50 ml of cyclohexane while mildly heating and agitating according to ASTM procedure D-1243 (1966). The pigmented polymer composition starting material useful in this invention has a molecular weight such that it possesses an I.V. (inherent viscosity) in the range of from about 0.2 to about 1.6 and preferably from about 0.4 to about 1.1.

Other additives which can be added include, but are not limited to, processing aids, impact modifiers, fillers and/or extenders, lubricants, antioxidants, antiozonates, fungicides, bactericides, plasticizers and additional pigments including carbon black.

The pigmented polymer compositions of the present invention may be processed using conventional mixing and forming equipment used for making polyvinyl chloride compounds. Specifically, a masterbatch comprising the pigmented polymer and the additives, including the whitener package, may be mixed in appropriate compounding equipment which might be closed, such as a Brabender, Banbury or Henschel mixer, or open, such as a rolling mill. The resulting powder mix may be used or pelletized for use in further forming equipment. Such equipment includes, for example, single or twin screw extruders, calendering, or injection or blow molding equipment.

The mullite compositions (pigments) used in the examples and Tables I and II are described below:

M-1—Scanning electron microscopy (SEM) revealed the calcined material to consist of irregularly shaped blocky particles and plates (mainly in the smaller particles). The particles had regular surfaces with no macroscopic surface features. Almost all of the particles had equivalent spherical diameters less than 100 $\mu$m. The average particle size was determined to be less than 10 $\mu$m. The BET ($N_2$) surface area (SA) was determined to be 1.02 $m^2/g$ with a total pore volume (TPV) of 0.0031 cc/g and an average pore diameter (APD) of 121Å. X-ray diffraction (XRD) analysis showed M-1 consisted of mullite with $\alpha$-cristobalite as a major impurity phase.

M-2—SEM revealed the calcined material had particle shape, texture, and size characteristics essentially identical to those of M-1. The BET SA was determined to be 0.70 $m^2/g$ with TPV=0.0024 cc/g and APD=136Å. XRD analysis showed the material to consist of mullite and a minor impurity phase of $\alpha$-cristobalite.

M-3—SEM Revealed the calcined material had particle shape, size, and texture characteristics essentially identical to those of M-1. The BET SA was determined to be 0.177 $m^2/g$ with TPV=0.0024 cc/g and APD=123Å. XRD analysis showed only mullite and a trace of $\alpha$-cristobalite.

M-4—SEM revealed the calcined material had a narrow particle size distribution centered around an average particle size on the order of 1-2 $\mu$m in diameter. The particles occurred as elongated thin slabs less than 4 $\mu$m long. The BET SA was determined to be 2.7 $m^2/g$ with TPV=0.0061 cc/g and APD=92Å. XRD analysis showed mullite and less than 3 percent $\alpha$-cristobalite as an impurity phase.

M-5—SEM revealed the calcined material consisted of hollow spherical particles with relatively featureless surfaces and an average particle size less than 5 $\mu$m in diameter. The BET SA was determined to be 1.5 $m^2/g$ with TPV=0.0031 cc/g and APD=83Å. XRD analysis showed mullite to be the major phase. The other phases found in significant concentrations were an amorphous phase and a silica phase with a disordered quartz structure. Halloysite, $Al_2Si_2O_5(OH)_4$, also was present, but as a minor component.

M-6—SEM revealed the calcined material had particle shape, size, and texture characteristics essentially identical to those of M-5. The BET SA was determined to be 1.7 $m^2/g$ with TPV=0.0024 cc/g and APD =58Å. XRD showed the chemical composition of M-6 to be essentially identical to that of M-5.

M-7—SEM revealed the calcined material consisted of particles less than 5 $\mu$m in diameter and an average particle size less than 1 $\mu$m. These highly textured particles had a platy habit. The BET SA was determined to be 14 $m^2/g$ with TPV=0.044 cc/g and APD =124Å. XRD analysis showed the major phases to be mullite, the anatase form of $TiO_2$, a mixture of intermediate aluminum oxide phases, principally $\gamma$-, $\delta$-, and $\theta$-$Al_2O_3$, and an amorphous phase.

M-8—SEM revealed the calcined material had a platy lamellar structure. The largest particles had diameters on the order of 8 $\mu$m, and the average particle size was on the order of 1-2 $\mu$m. The BET SA was determined to be 7.2 $m^2/g$ with TPV=0.022 cc/g and APD =122Å. XRD analysis showed the major phases to be mullite, the anatase form of $TiO_2$, and an amorphous phase. A mixture of intermediate aluminum oxides, as discussed above for M-7, constituted a minor phase.

M-9—SEM revealed the calcined material consisted of irregularly shaped particles with a generally platy habit. The largest particles were on the order of 6 $\mu$m in diameter, and the average particle size was about 2 $\mu$m. The BET SA was determined to be 8.1 $m^2/g$ with TPV=0.30 cc/g and APD=148Å. XRD analysis showed the chemical composition to be very similar to that of M-7.

M-10—SEM revealed the fused material consisted of featureless blocky particles with irregular shapes. The largest particles were less than about 10 $\mu$m in diameter, and the average particle size was less than 5 $\mu$m. The BET SA was determined to be 1.5 $m^2/g$ with TPV=0.0042 cc/g and APD=109Å. XRD analysis showed that the M-10 material consisted of at least 95 percent mullite by weight with $\alpha$-$Al_2O_3$ as the only detected impurity phase.

The cordierite compositions (pigments) used in the examples and Table 3 are described below:

C-1—SEM revealed the calcined material consisted of a mixture of large blocky particles and smaller flakes. Electron dispersive X-ray analysis (EDX) showed the presence of an occasional particle of periclase (MgO), and $SiO_2$ rich and $Al_2O_3$ rich aluminosilicate phases, accompanying the major cordierite phase. The cordierite particles had smooth surfaces while the impurity particles were highly structured. The C-1 pigment had a very broad particle size distribution ranging from about 44 $\mu$m to 1 $\mu$m in diameter. The BET SA was determined to be 0.62 $m^2/g$. XRD analysis verified that the major crystalline phase was a mixture of $\alpha$- and $\beta$-cordierite. The minor crystalline impurity phases were identified as periclase and spinel ($MgAl_2O_4$). XRD analysis also showed the presence of a significant concentration of amorphous material that had characteristic XRD features consistent with an aluminosilicate phase.

C-2—SEM revealed the calcined material consisted of highly structured particles with an average particle size less than 5 $\mu$m in diameter. The BET SA was determined to be 3.5 $m^2/g$ with TPV=0.0095 cc/g and APD=107Å. XRD analysis showed the major components of the C-2 pigment were $\beta$-cordierite and $\alpha$-$Al_2O_3$. The minor phases present were enstatite ($MgSiO_3$) and an enstatite type phase containing some Al.

C-3—SEM revealed the calcined material had a narrow distribution of irregular particles tending to have a platy habit. The average particle size was on the order of 1 $\mu$m, and all of the particles had diameters less than about 5 $\mu$m. The BET SA was determined to be 3.4 $m^2/g$ with TPV=0.0079 cc/g and APD=92Å. XRD analysis showed that C-3 was mainly $\alpha$-cordierite (only a trace of $\beta$-cordierite was detected). Mullite was present as an impurity phase, but at a very low concentration, less than 1 percent by weight.

The performance of the mullite extender pigments for $TiO_2$, described in Examples 2-11, is presented in Tables I and II. The performance of the cordierite extender pigments for $TiO_2$, described in Examples 12-14, is presented in Table III.

EXAMPLES

Example 1

This example presents the preparation of the control PVC compound containing 10 parts per hundred parts resin (phr) $TiO_2$ as an opacifying and whitening agent, with the batch size based on 100 pounds of PVC resin.

In a high speed powder mixer were blended 100 parts PVC resin (inherent viscosity=0.9), 5 phr polymeric processing aid, 2 phr epoxidized soybean oil, 1 phr tin stabilizer, 3.2 phr external lubricants, and 10 phr titanium dioxide (DuPont TiPure R-100). The powder blend was processed and sheeted out for five minutes on a set of two-roll mills heated to 176° C. Sheets (15.24 cm = 15.24 cm = 0.0762 cm) were pressed for two minutes in a press at 182° C. The resulting product was examined for color using an ACS 1400 Spectrophotometer, CIE Lab test procedures and color differentiating formula. The reported results were calculated averages of five readings. DE* and Yellowness Index (Y.I.) values were found to be especially useful optical parameters for characterizing the appearance of the test PVC compounds. The DE* value is a qualitative measurement of the total color difference between a color standard and a sample. This difference includes the lightness and chromaticity differences. The lower the DE* value, the closer the color appears to the color of the standard white plaque (DE*=1.00) of the ACS 1400 Spectrophotometer. The Y.I. value is a calculated value that represents the intensity of the reflectance in the yellow region of the visible spectrum. Yellowing generally is a sign of aging and decomposition of PVC materials. Therefore, a low value of Y.I. is desirable. Percent light transmittance was determined by measuring the actual transmitted light in foot candles and dividing the value by 8,000—the average intensity of direct sunlight in foot candles at noon, in summer, at 45 degrees from the horizon for locales between 30 and 40 degrees latitude north. In the trade, percent light transmission is often referred to as opacity and the two terms are often used interchangeably. The DE*, Y.I. and light transmittance values for the control PVC compound of this example are shown in Tables I and II.

EXAMPLE 2

The procedure of Example 1 was repeated except that 8 phr $TiO_2$ and 2 phr M-1 were used with the batch size based on 1.66 pounds of PVC resin.

EXAMPLE 3

The procedure of Example 2 was repeated except that 8 phr $TiO_2$ and 2 phr M-2 were used.

EXAMPLE 4

The procedure of Example 2 was repeated except that 8 phr $TiO_2$ and 2 phr M-3 were used.

EXAMPLE 5

The procedure of Example 2 was repeated except that 8 phr $TiO_2$ and 2 phr M-4 were used.

EXAMPLE 6

The procedure of Example 2 was repeated except that 8 phr $TiO_2$ and 2 phr M-5 were used.

EXAMPLE 7

The procedure of Example 2 was repeated except that 8 phr $TiO_2$ and 2 phr M-6 were used.

EXAMPLE 8

The procedure of Example 2 was repeated except that 8 phr $TiO_2$ and 2 phr M-7 were used.

EXAMPLE 9

The procedure of Example 2 was repeated except that 8 phr $TiO_2$ and 2 phr M-8 were used.

EXAMPLE 10

The procedure of Example 2 was repeated except that 8 phr $TiO_2$ and 2 phr M-9 were used.

EXAMPLE 11

The procedure of Example 2 was repeated except that 8 phr $TiO_2$ and 2 phr M-10 were used.

EXAMPLE 12

The procedure of Example 2 was repeated except that 8 phr $TiO_2$ and 2 phr C-1 were used.

EXAMPLE 13

The procedure of Example 2 was repeated except that 8 phr $TiO_2$ and 2 phr C-2 were used.

EXAMPLE 14

The procedure of Example 2 was repeated except that 8 phr $TiO_2$ and 2 phr C-3 were used.

TABLE I

Mullite Extender Pigments in a Polyvinyl Chloride Composition: Effect of Concentration

| Example | Mullite Extender | Approx. Weight % Mullite | Mullite Level (phr) | $TiO_2$[a] Level (phr) | $DE^{*}$[b] | Y.I.[c] | % Light Transmission[d] |
|---|---|---|---|---|---|---|---|
| 1 (Control) | — | — | — | 10 | 2.54 | 5.99 | 0.740 |
| 2 | M-1 | 65 | 2 | 8 | 0.83 | 4.79 | 0.323 |
| 3 | M-2 | 77 | 2 | 8 | 0.79 | 4.49 | 0.292 |
| 4 | M-3 | 87 | 2 | 8 | 0.29 | 4.50 | 0.211 |

[a] DuPont TiPure R-100 $TiO_2$
[b] Measure of the overall appearance of the PVC compounds
[c] Yellowness Index - a measure of the yellowness of the sample
[d] A measure of opacity - the smaller the value, the more opaque the sample
Both $DE^{*}$ and Y.I. are spectrophotometrically derived, and lower values are desirable in each case.

TABLE II

Performance of Mullite $TiO_2$ Extender Pigments in a Polyvinyl Chloride Composition

| Example | Mullite Extruder | Mullite Level (phr) | $TiO_2$ Level (phr) | $DE^{*}$ | Y.I. | % Light Transmission |
|---|---|---|---|---|---|---|
| 1 (Control) | — | — | 10 | 2.54 | 5.99 | 0.740 |
| 2 | M-1 | 2 | 8 | 0.83 | 4.79 | 0.323 |
| 3 | M-2 | 2 | 8 | 0.79 | 4.49 | 0.292 |
| 4 | M-3 | 2 | 8 | 0.29 | 4.50 | 0.211 |
| 5 | M-4 | 2 | 8 | 1.01 | 2.58 | 0.154 |
| 6 | M-5 | 2 | 8 | 3.13 | 2.60 | 0.020 |
| 7 | M-6 | 2 | 8 | 1.79 | 2.66 | 0.170 |
| 8 | M-7 | 2 | 8 | 0.82 | 4.03 | 0.350 |
| 9 | M-8 | 2 | 8 | 1.22 | 5.81 | 0.323 |
| 10 | M-9 | 2 | 8 | 1.60 | 4.86 | 0.528 |
| 11 | M-10 | 2 | 8 | 1.06 | 2.85 | 0.041 |

TABLE III

Performance of Cordierite $TiO_2$ Extender Pigments in a Polyvinyl Chloride Composition

| Example | Cordierite Extender | Cordierite Level (phr) | $TiO_2$ Level (phr) | $DE^{*}$ | Y.I. | % Light Transmission |
|---|---|---|---|---|---|---|
| 1 (Control) | — | — | 10 | 2.54 | 5.99 | 0.740 |
| 12 | C-1 | 2 | 8 | 0.82 | 3.41 | 0.361 |
| 13 | C-2 | 2 | 8 | 0.22 | 4.42 | 0.120 |
| 14 | C-3 | 2 | 8 | 1.06 | 3.50 | 0.274 |

The data in Table I show that the M-1, M-2 and M-3 mullite pigments are very effective extender pigments for $TiO_2$ in PVC. Each pigment, when substituted for 20 percent of the $TiO_2$ in the control PVC compound, improved the appearance of the compound in terms of lowering both $DE^{*}$ and Y.I., the Yellowness Index. In addition, each of the mullite pigments functioned as very effective opacifying agents, and significantly decreased the transmission of light through their respective compounds relative to the PVC control compound.

It is significant to note that the appearance and opacity improve in the direction of M-1, M-2 and M-3, since this is the direction of increasing mullite concentration, and since these three pigments were made under similar conditions, and have very similar physical properties. The conclusion, for this well controlled series of very similar mullite pigments, is that the performance of M-1, M-2 and M-3 as extender pigments for $TiO_2$ in the control PVC compound is proportional to their mullite content.

Table II is an expanded version of Table I that shows the ability of a large number of mullite containing materials, made under different conditions and having significantly different chemical compositions and physical properties, to be effective extender pigments for $TiO_2$ in the control PVC compound. With the exception of M-5, that gave a $DE^{*}$ value not quite as good as that of the control, each of the 10 mullite pigments improved opacity (decreased light transmission), and improved the appearance in terms of lowering the measured values of Y.I. and $DE^{*}$. A most striking contrast is provided by M-10. This is the only one of the mullite pigments in Table II that was made from the fused state. The other pigments were made using a traditional high temperature calcination to effect the desired formation of, or conversion to mullite. As shown in Table II, the M-10 pigment was one of the most effective mullite pigments for lowering light transmission and improving opacity.

Table II summarizes the performance of three cordierite pigments with very different chemical compositions and physical properties. All three of these pigments were effective replacement pigments for $TiO_2$ in the control compound at the 20 percent replacement level. Each pigment gave lower values of $DE^{*}$, Y.I., and percent of transmitted light relative to the control PVC compound.

While in accordance with the Patent Statutes, the best mode and preferred embodiment has been set forth, the scope of the invention is not limited thereto, but rather by the scope of the attached claims.

What is claimed is:

1. A pigmented polymer composition, comprising;
a pigmented polymer, said pigmented polymer comprising (1) a vinyl chloride polymer prepared from vinyl chloride monomer,
(2) a polyvinylidene chloride prepared from vinylidene chloride,
(3) a copolymer of vinyl chloride monomer and a vinyl component monomer, or
(4) a mixture of polyvinyl chloride and
  (a) a polymer prepared from a vinyl component monomer,
  (b) a halogenated polymer prepared from a nonvinyl component monomer,
  (c) a polyester,
  (d) a polyurethane,
  (e) a polyethylene oxide polymer, or
  (f) mixtures thereof, and
a whitening-opacifying package comprising from about 2-30 parts titanium dioxide per 100 parts vinyl chloride polymer and an effective amount of an aluminosilicate composition comprising mullite or cordierite as a partial titanium dioxide replacement to give a vinyl chloride polymeric composition having substantially the same or improved optical properties of overall appearance, Yellowness Index and a percent light transmission as when containing only titanium dioxide.

2. The composition of claim 1 wherein the whitening-opacifying package comprises from about 2 to about 15 phr titanium dioxide per 100 parts vinyl chloride polymer having an inherent viscosity of from about 0.2 to about 1.6 and from about 1 up to about 5 phr of an aluminosilicate composition comprising mullite or cordierite having a particle size of up to about 20 microns.

3. The composition of claim 2 wherein the whitening-opacifying package comprises from about 4 to about 10 phr titanium dioxide per 100 parts vinyl chloride polymer having an inherent viscosity of from about 0.4 to about 1.1 and from about 1 up to about 3 phr of an aluminosilicate composition comprising mullite or cordierite having a particle size of up to about 10 microns.

4. The composition of claim 3 wherein the pigmented polymer comprises a vinyl chloride polymer.

5. The composition of claim 3 wherein the pigmented polymer comprises polyvinylidene chloride.

6. The composition of claim 3 wherein the pigmented polymer comprises a copolymer of vinyl chloride monomer and a vinyl component monomer in a weight ratio of from about 70:30 to about 95:5, wherein the vinyl component monomer is an ester of acrylic acid or methacrylic acid wherein the ester portion contains from 1 to about 12 carbon atoms, vinyl acetate, vinyl aliphatic esters containing from 3 to about 18 carbon atoms, styrene and styrene derivatives containing from about 8 to about 15 carbon atoms, butadiene, isoprene, chloroprene or mixtures thereof.

7. The composition of claim 3 wherein the pigmented polymer comprises a mixture of polyvinyl chloride and
  (a) a polymer prepared from a vinyl component monomer,
  (b) a halogenated polymer prepared from a nonvinyl component monomer,
  (c) a polyester,
  (d) a polyurethane,
  (e) a polyethylene oxide polymer, or
  (f) mixtures thereof.

8. The composition of claim 7 wherein the weight ratio of polyvinyl chloride:
  (a) a polymer prepared from a vinyl component monomer,
  (b) a halogenated polymer prepared from a nonvinyl component monomer,
  (c) a polyester,
  (d) a polyurethane,
  (e) a polyethylene oxide polymer, or
  (f) mixtures, thereof,
is from about 70:30 to about 95:5.

9. The composition of claim 8 wherein the vinyl component monomer is an ester of acrylic acid or methacrylic acid wherein the ester portion contains from to about 12 carbon atoms, vinyl acetate, vinyl aliphatic esters containing from 3 to about 18 carbon atoms, styrene and styrene derivatives containing from about 8 to about 15 carbon atoms, butadiene, isoprene, chloroprene or mixtures thereof.

10. The composition of claim 9 wherein the halogenated polymer comprises chlorosulfonated polyethylene, chlorosulfonated polypropylene, chlorinated polyethylene, chlorinated polypropylene, or polyepichlorohydrin.

11. A pigmented chlorinated vinyl chloride polymeric composition, comprising;
a chlorinated vinyl chloride polymer containing from about 48 percent up to about 74 percent chlorine prepared by chlorinating
  (1) polyvinyl chloride,
  (2) a copolymer of vinyl chloride monomer and a vinyl component monomer, or
  (3) mixtures thereof, and
a whitening-opacifying package comprising from about 2-30 parts titanium dioxide per 100 parts chlorinated vinyl chloride polymer and an effective amount of an aluminosilicate composition comprising mullite or cordierite as a partial titanium dioxide replacement to give a chlorinated vinyl chloride polymeric composition having substantially the same or improved optical properties of overall appearance, Yellowness Index and a percent light transmission as when containing only titanium dioxide.

12. The composition of claim 11 wherein the whitening-opacifying package comprises from about 2 to about 15 phr titanium dioxide per 100 parts chlorinated vinyl chloride polymer having an inherent viscosity of from about 0.2 to about 1.6 and from about 1 up to about 5 phr of an aluminosilicate composition comprising mullite or cordierite having a particle size of up to about 20 microns.

13. The composition of claim 12 wherein the whitening-opacifying package comprises from about 4 to about 10 phr titanium dioxide per 100 parts chlorinated vinyl chloride polymer having an inherent viscosity of from about 0.4 to about 1.1 and from about 1 up to about 3 phr of an aluminosilicate composition comprising mullite or cordierite having a particle size of up to about 10 microns.

14. The composition of claim 13 wherein the pigmented chlorinated vinyl chloride polymer is prepared by chlorinating polyvinyl chloride.

15. The composition of claim 13 wherein the pigmented chlorinated vinyl chloride polymer is prepared by chlorinating
a copolymer of vinyl chloride monomer and
a vinyl component monomer in a weight ratio of from about 70:30 to about 95:5 wherein the vinyl component monomer is an ester of acrylic acid or methacrylic acid wherein the ester portion contains from 1 to about 12 carbon atoms, vinyl acetate, vinyl aliphatic esters containing from 3 to about 18 carbon atoms, styrene and styrene derivatives containing from about 8 to about 15 carbon atoms, butadiene, isoprene, chloroprene or mixtures thereof.

16. A pigmented polymer composition, comprising; a mixture of
   (A) a chlorinated vinyl chloride polymer containing from about 48 percent up to about 74 percent chlorine prepared by chlorinating
      (1) polyvinyl chloride or
      (2) a copolymer of vinyl chloride monomer and a vinyl component monomer, with
   (B) any of the following polymers
      (1) a polymer prepared from a vinyl component monomer,
      (2) a halogenated polymer prepared from a non-vinyl component monomer,
      (3) a polyester,
      (4) a polyurethane,
      (5) a polyethylene oxide polymer, or
      (6) mixtures thereof, wherein the weight ratio of (A):(B) is from about 70:30 to about 95:5, and
   wherein said mixture is combined with a whitening-opacifying package comprising from about 2-30 parts titanium dioxide per 100 parts vinyl chloride polymer and an effective amount of an aluminosilicate composition comprising mullite or cordierite as a partial titanium dioxide replacement to give a vinyl chloride polymeric composition having substantially the same or improved optical properties of overall appearance, Yellowness Index and a percent light transmission as when containing only titanium dioxide.

17. The composition of claim 16 wherein the whitening-opacifying package comprises from about 2 to about 15 phr titanium dioxide per 100 parts chlorinated vinyl chloride polymer having an inherent viscosity of from about 0.2 to about 1.6 and from about 1 up to about 5 phr of an aluminosilicate composition comprising mullite or cordierite having a particle size of up to about 20 microns.

18. The composition of claim 17 wherein the whitening-opacifying package comprises from about 4 to about 10 phr titanium dioxide per 100 parts chlorinated vinyl chloride polymer having an inherent viscosity of from about 0.4 to about 1.1 and from about 1 up to about 3 phr of an aluminosilicate composition comprising mullite or cordierite having a particle size of up to about 10 microns.

19. The composition of claim 18 wherein (A) is a chlorinated vinyl chloride polymer containing from about 48 percent up to about 74 percent chlorine prepared by chlorinating polyvinyl chloride.

20. The composition of claim 18 wherein (A) is a chlorinated vinyl chloride polymer containing from about 48 percent up to about 74 percent chlorine prepared by chlorinating a copolymer of vinyl chloride monomer and a vinyl component monomer in a weight ratio of from about 70:30 to about 95:5, wherein the vinyl component monomer is an ester of acrylic acid or methacrylic acid wherein the ester portion contains from 1 to about 12 carbon atoms, vinyl acetate, vinyl aliphatic esters containing from 3 to about 18 carbon atoms, styrene and styrene derivatives containing from about 8 to about 15 carbon atoms, butadiene, isoprene, chloroprene or mixtures thereof.

21. The composition of claim 19 wherein the halogenated polymer comprises chlorosulfonated polyethylene, chlorosulfonated polypropylene, chlorinated polyethylene, chlorinated polypropylene, or polyepichlorohydrin, wherein the halogenated polymer is present at from about 7 to about 20 percent by weight.

22. The composition of claim 20, wherein the halogenated polymer comprises chlorosulfonated polyethylene, chlorosulfonated polypropylene, chlorinated polyethylene, chlorinated polypropylene, or polyepichlorohydrin, wherein the halogenated polymer is present at from about 7 to about 20 percent by weight.

* * * * *